POSITIONALLY SELECTIVE COMMUNICATION SYSTEM

Filed May 18, 1949 2 Sheets-Sheet 1

INVENTORS
GEORGE B. LITCHFORD
JOSEPH LYMAN
BY
Paul B. Hunter
ATTORNEY

POSITIONALLY SELECTIVE COMMUNICATION SYSTEM

Filed May 18, 1949

2 Sheets-Sheet 2

INVENTORS
GEORGE B. LITCHFORD
JOSEPH LYMAN
BY
Paul B. Hunter
ATTORNEY

Patented Sept. 21, 1954

2,689,953

UNITED STATES PATENT OFFICE 2,689,953

POSITIONALLY SELECTIVE COMMUNICATION SYSTEM

George B. Litchford and Joseph Lyman, Huntington, N. Y., assignors to The Sperry Corporation, a corporation of Delaware Application May 18, 1949, Serial No. 94,012

9 Claims. (Cl. 343—6)

Figure 1:
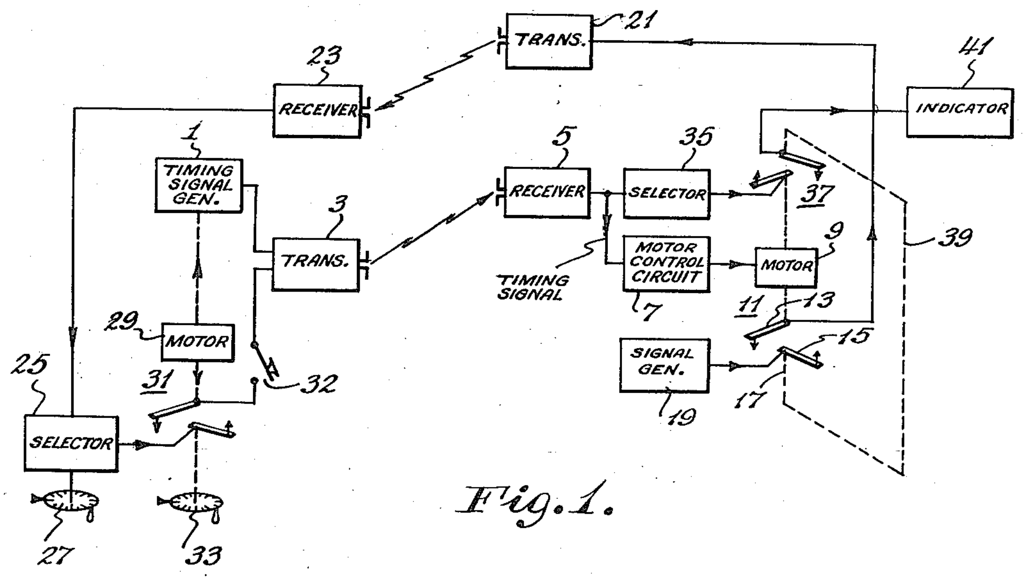

This invention relates to selective communication systems, and more particularly to systems for communicating from a reference station, for example an air traffic control center, to any selected one of a plurality of other stations which may be mobile stations, such as aircraft.

According to the principles of the invention, each receiving station or mobile station is identified in terms of two variables which may be and preferably are positional coordinates such as the distance and direction of the respective mobile station from the reference station. A signal having two independently variable characteristics is produced at the mobile station, controlled according to the respective identifying variables, and transmitted to the reference station. The signals from all mobile stations involved are received at the reference station. The signal corresponding to the mobile station to which a communication is to be sent is selected and transmitted, either in its original form or in an altered but corresponding form, to the selected mobile station. Here the received signal is compared with that originally transmitted, and used to effect an indication only if they correspond.

Thus it is one of the principal objects of the present invention to provide improvements in ground station to aircraft communication systems, whereby selection may be made at the ground or reference station of which of a plurality of aircraft stations is to respond to a given communication.

More broadly, it is also an object to provide systems for selective communication from a transmitting station to any one of a plurality of receiving stations, mobile or fixed.

Another object of the present invention is to provide selective communication systems of the described type wherein identifying signals are transmitted from the stations to which communications may be sent, received at the station or stations from which communications are to be sent, selected in accordance with the identity of the particular station to be communicated with, retransmitted and compared at the receiving stations with the originally transmitted signals to provide indications or to enable response to other signals from the transmitting station.

A further object is to provide systems of the described type wherein positional information is obtained on each of a plurality of mobile craft and relayed to a reference station, where the positions of all such craft are depicted on a common display, and means are provided at the reference station for selectively transmitting to any of said aircraft in accordance with their respective positions as indicated on said display.

Another object of this invention is to provide selective communication systems adapted to utilize some of the elements of a position determining and indicating system, and to be integrated therewith to provide a traffic control system.

A further object is to provide systems of the described type wherein substantially "private line" communication can be obtained from one station exclusively and selectively to any of a plurality of other stations.

Figure 2:
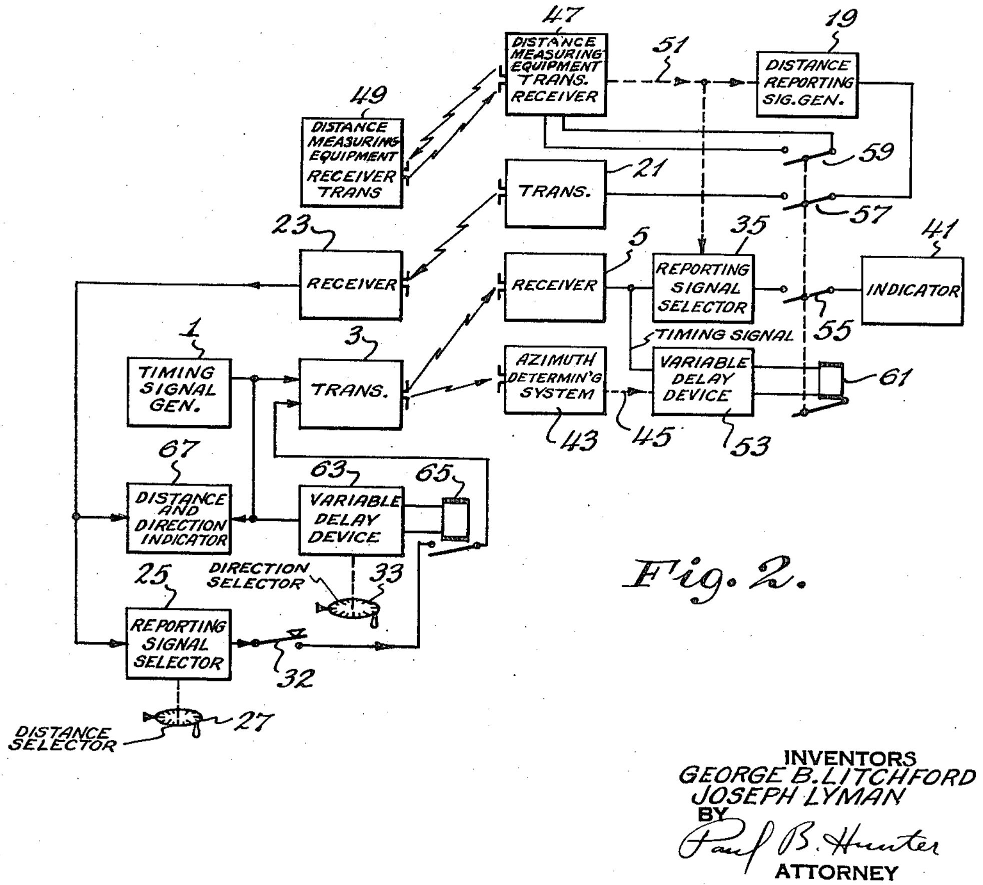
Figure 3:
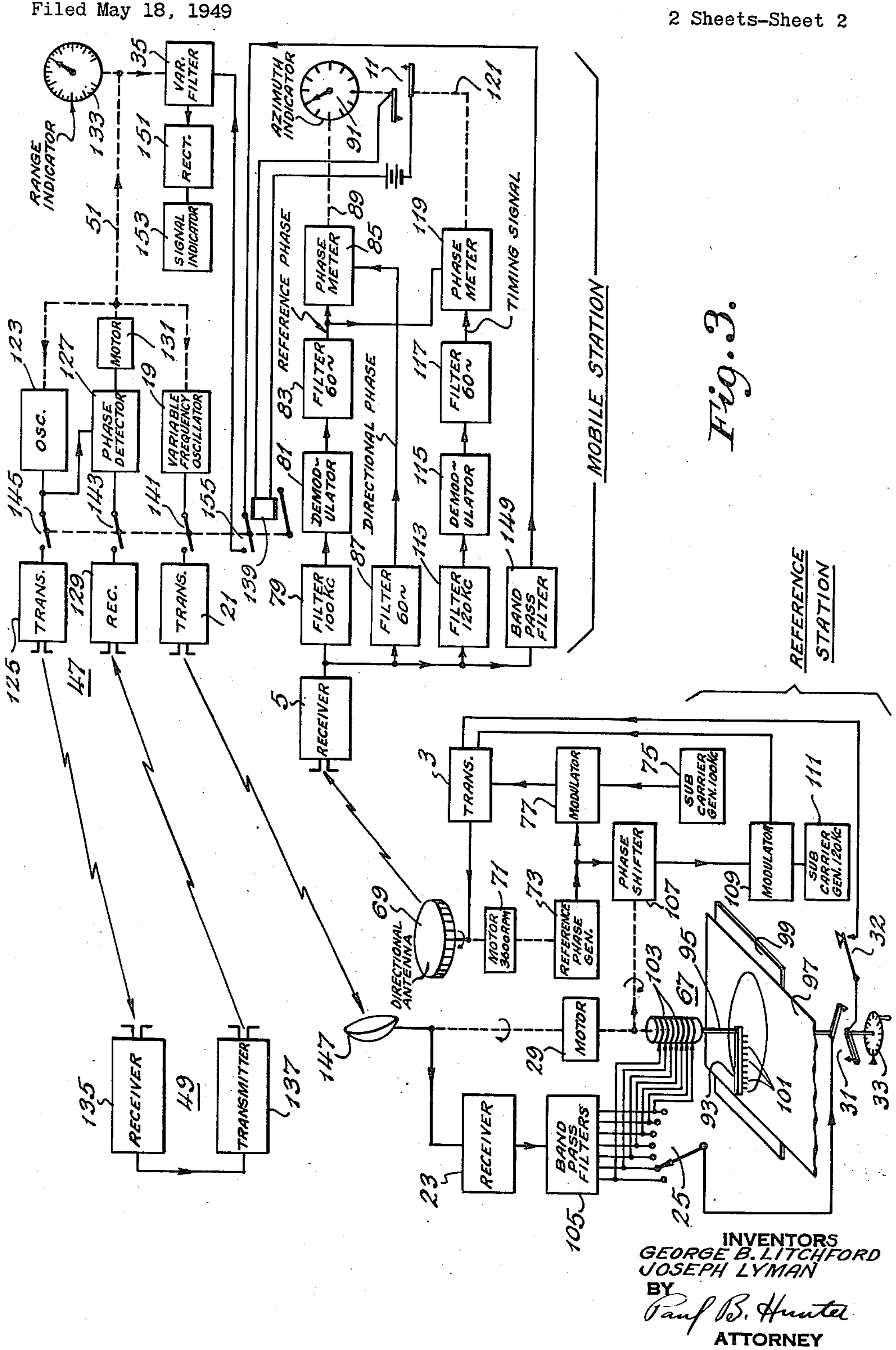

The invention will be described with reference to the accompanying drawings, wherein:

Fig. 1 is a schematic block diagram of a communication system embodying principles of the instant invention, Fig. 2 is a schematic block diagram of a system like that of Fig. 1 modified somewhat and including further features of the invention, and Fig. 3 is a schematic block diagram of a system substantially like that of Fig. 2, shown in more specific detail than in Fig. 2.

Referring to Fig. 1, the transmitting or reference station includes a source 1 of timing signals and a transmitter 3. The signals generated by the source 1 may be any periodic waves or impulses defining or marking specific time intervals, and they are transmitted by the transmitter 3 to all receiving or mobile stations involved in the system. One such receiving station is shown at the right hand side of Fig. 1, and it includes a receiver 5 arranged to respond to the transmitter 3 and reproduce the timing signal. The received and reproduced timing signal is applied to a motor control circuit 7, which controls the energization of a motor 9 to synchronize it with the timing signal.

A switch 11 having two independently movable contact elements such as rotatable arms 13 and 15 has one of its elements 13 coupled to the motor 9 and driven thereby in synchronism with the timing signal. The other contact element 15 may be positioned as required, by rotation of a shaft 17, schematically indicated by a dash line.

Each mobile station includes a source 19 of signals characteristic of that particular station in some manner. For example, the source 19 may be an oscillator whose frequency depends upon the identity or, as will be explained further, upon a positional coordinate of the mobile station. The source 19 is connected through the switch 11 to a transmitter 21.

At the reference station, a receiver 23 is arranged to respond to the transmitter 21 and to the corresponding transmitters at any other mobile stations. The output of the receiver 23 is applied to an adjustable selector device 25, which may be a variable frequency pass filter, or may be a bank of band pass filters tuned to different frequencies with switch means for selecting the particular band or bands to be passed. In any event, the selector device 25 is arranged to have its response adjusted manually as by means of a handwheel 27.

A motor 29 running at a normally constant speed is coupled to one element of a switch 31 like the switch 11 at the mobile station. The motor 29 either drives the timing signal generator 1, or is controlled by the timing signal like the motor 9. In either case, the rotation of the motor 29 is synchronous with the timing signal and with the rotation of the motor 9, as well as with that of the corresponding motors at any other mobile stations. The position of the second movable element of the switch 31 is manually adjustable as by means of a handwheel 33. The output of the selector device 25 is applied through the switch 31 and a key 32 to the transmitter 3.

At the mobile station, the output circuit of the receiver 5 is connected to a selector such as a filter 35 which is adjusted to pass substantially only signals like that provided by the oscillator 19. A switch 37, similar to the switch 11, has one of its contact elements driven by the motor 9 and its other contact element is ganged with the element 15 of the switch 11, as shown by the dash line 39. An output terminal of the filter 35 is connected through the switch 37 to an indicator 41.

In the operation of the system of Fig. 1, the motors 9 and 29 run in substantial synchronism. Assuming some specific angular position of the shaft of the motor 9 with respect to its stator as a reference or zero position, the actual position of the shaft with respect to this reference will be the same as that of the motor 29 with respect to a corresponding reference. Thus the contacts of the switches 11, 37 and 31, driven by the motors 9 and 29 respectively, will be at all times in corresponding positions. All of said contacts will be at their respective reference positions at certain recurrent instants, for example at the beginning of each cycle of the timing signal.

As the contact 13 is rotated by the motor 9, it momentarily engages the contact 15, closing the switch 11 once during each period of the timing signal. The instant of closure will not necessarily or ordinarily coincide with the beginning of the timing signal, but is delayed with respect thereto by an amount which depends upon the angular position of the shaft 17. It will be apparent that this delay may be any amount from zero up to the interval required for a complete rotation of the motor 9, which interval is the repetition period of the timing signal. Closure of the switch 37 may be substantially synchronous with that of the switch 11.

The delay introduced as described above at each mobile station is characteristic of that particular station and may be made to correspond to the identity of the station or to a positional coordinate thereof. At the reference station, the switch 31 closes momentarily, like the switches 11 and 37, once during each repetition period of the timing signal. The closure of the switch 31 is delayed with respect to the beginning of the timing signal, by an amount which depends upon the adjustment of the handwheel 33.

To effect communication to a desired mobile station, the delay in closure of the switch 31 is adjusted to correspond to that of the switches 11 and 13, and the selector device 25 is adjusted to pass the signal originating at the source 19. The key 32 is closed, and as the motors 9 and 29 rotate together, the switches 11, 37 and 31 will all close at the same instant during each period of the timing signal. During the relatively brief interval while the switches are closed, the signal from the source 19 is transmitted by way of the transmitter 21 and the receiver 23 to the reference station, passed by the selector 25, and relayed back by way of the transmitter 3 and the receiver 5 to the mobile station. Here the signal passes through the selector 35 and the switch 37 to the indicator 41. Thus, as long as the various adjustments remain unchanged and the key 32 remains closed, the indicator 41 will receive one impulse during each timing cycle.

The key 32 may be opened and closed to send a coded signal, for example in Morse code, or the signal may be modulated in some other known manner. As an alternative, another communication channel may be provided, using either the transmitter 3 or a separate transmitter, and the impulses from the selector 35 may be used merely to turn on the indicator 41 or enable it to respond to signals transmitted by the separate channel.

Signals from the reference station intended for one particular mobile station will not produce a response at any other mobile station, because the switch closure delay and/or the frequency of the source 19 will be different at any two different receiving stations. Thus there is, in effect, substantially a "private line" from the reference station to each of the mobile stations. It will be apparent that independent transmissions can be made substantially simultaneously to two or more mobile stations by providing an additional selector 25, switch 31, and key 32 for each additional mobile station. Also, transmissions may be "broadcast" to all the mobile stations by simply by-passing the output of the receiver 23 around the selector 25 and the switch 31.

As mentioned before, the characteristic signals transmitted by each mobile station may be controlled according to respective positional coordinates, for example the distance and the direction of the mobile station from a reference point such as the reference station location. Referring to Fig. 2, wherein elements corresponding to those of Fig. 1 are designated by corresponding reference characters, the mobile station includes an azimuth determining system 43 adapted to cooperate with the transmitter 3 to indicate the direction of the mobile, or receiving station from the transmitting or reference station. The device 43 is preferably of any known type which provides its indication by angularly positioning a shaft 45.

Radio distance measuring equipment (DME) is provided for determining the distance of the mobile station from the reference station. This apparatus includes two units, a transmitter-receiver 47 at the mobile station and a "transponder" 49 at the reference station. The transponder 49 comprises a receiver and a transmitter controlled by the output of the receiver to retransmit signals received from the mobile unit 47. The mobile station unit 47 includes means for measuring the timing or phase of the transmitted signals with respect to the received signals, and for rotating a shaft 51 accordingly. Since the delay of the received signals with respect to the transmitted signals depends upon the time required for radiation to travel the round trip between the two stations, the position of the shaft 51 corresponds to the distance.

In the system of Fig. 2, the timing signal output of the receiver 5 is applied to a variable delay device 53. The device 53 may be a motor synchronized with the timing signal, like the motor 9 of Fig. 1, and a switch driven thereby, like the switch 13 of Fig. 1, or other known apparatus for closing a circuit or providing an output pulse at some instant which is later than the beginning of the timing cycle by a variable amount. The device 53 is arranged to operate switches 55, 57 and 59 as by means of an electromagnet 61. The delay in closure of said switches is controlled by the shaft 45 in accordance with the direction of the mobile station from the reference station.

The signal generator 19 in the system of Fig. 2 may be a variable frequency oscillator whose frequency is controlled by the shaft 51, and thus is a function of the distance. The selector 35 may be a relatively narrow band pass filter, or simply a resonant circuit, adjusted by the shaft 51 to pass substantially only signals of the frequency of the oscillator 19.

The switch 55 performs the same function as the switch 37 of Fig. 1. The switch 59, when open, disables at least the transmitter portion of the DME unit 47, and preferably also prevents operation of the receiver portion. The switch 57, like the switch 11 in Fig. 1, momentarily connects the signal generator 19 to the transmitter 21.

A variable delay device 63, which may be similar to the device 53, is provided at the reference or transmitting station. The device 63 closes a switch 65 momentarily at an instant delayed with respect to the timing signal by an amount depending upon the adjustment of the handwheel 33.

The selector 25 at the reference station may be a narrow band adjustable filter or a simple resonant circuit, like the selector 35, and is adjustable by the handwheel 27.

The reference station equipment also includes distance and direction indicator means 67, arranged to show the positions of all of the mobile stations in the service area of the reference station. The means 67 may be independent of the communication system and comprise, for example, a surveillance radar apparatus of the PPI (plan position indicator) type, providing a map-like display wherein the various mobile craft are represented by luminous spots or "pips." However, it is preferred at present to use the positional information as determined on the respective mobile craft and transmitted to the reference station.

Accordingly, the means 67 may include a device such as a facsimile recorder providing a visual record or display in two coordinates corresponding to distance and direction respectively. The printing means may be controlled along one coordinate according to the frequency of a signal applied from the receiver 23, and along the other coordinate according to the time of arrival of said signal, with respect to the timing signal.

The operation of the system of Fig. 2 is substantially like that of Fig. 1 except that the operator at the reference station examines the display on the indicator 67 to determine the distance and direction of the mobile station with which he wishes to communicate, and adjusts the handwheels 27 and 33 accordingly. As in the operation of Fig. 1, only the indicator 41 at the selected mobile station will be actuated, because either the delay of the device 53 or the frequency of the generator 19, or both, will differ from that at any other mobile station.

During the period of each timing cycle, the switches at the various mobile stations are closed in succession, in the order of their respective azimuth angles from the reference station. Thus, whether or not any communications are being sent from the reference station, each mobile station is "interrogated" once during each timing period, and responds by transmitting information as to its position, in the form of a pulse from the generator 19. This information is displayed on the indicator 67 at the reference station.

It will be apparent that the information as to its own position is available directly at each mobile station, as the angular positions of the direction and distance shafts 45 and 51 respectively. These shafts may be connected to correspondingly calibrated dials or counters. As a somewhat more complicated alternative, which might be preferable in some circumstances, a combined indicator similar to the reference station indicator 67 may be provided at the mobile station and controlled by the same signals as are applied to the transmitter 21. A possible modification in this case may include a separate channel for relaying the output of the receiver 23 to the mobile station, so that the mobile station display will show not only its own position, but the positions of the other mobile stations.

Referring now to Fig. 3, wherein parts similar to those of Figs. 1 and 2 are designated by corresponding reference characters, the azimuth determining system comprises an omni-directional radio range, wherein the reference station transmits a rotating directional pattern and a reference phase signal, and the mobile station includes means to compare the phase of the modulation produced by pattern rotation with that of the reference phase signal to determine azimuth. The omni-directional range may be of any known type, for example that described and shown in U. S. Patent No. 2,564,703 of George B. Litchford et al., entitled Omni-Azimuth Guidance System. Although said system includes means for both coarse and fine determination of azimuth, only the coarse portion will be described herein because that is all that is necessary for a clear understanding of the present invention.

A directive antenna 69, designed to provide a heart-shaped or limacon pattern, is rotated continuously at a nominally constant speed of, for example, 3600 R. P. M., by a motor 71. The transmitter 3 is connected to the antenna 69. A reference phase generator 73, which may be a simple alternator, is also driven by the motor 71 and provides an output of frequency equal to that of the antenna rotation, i. e. 3600 cycles per minute or 60 cycles per second. A subcarrier generator or oscillator 75 provides a signal of, say 100 kilocycles per second, which is modulated in a modulator 77 by the output of the reference phase generator 73. The modulated subcarrier is applied to the transmitter 3 to modulate the main carrier, which may be of a super high frequency such as 5000 megacycles per second. It will be understood that the modulation in each case may be either amplitude or frequency modulation.

At the mobile station, the 100 kilocycle subcarrier in the output of the receiver 5 passes through a filter 79 to a demodulator 81. The output of the demodulator 81 includes a 60 cycle component corresponding to the output of the reference phase generator 73, and this passes through a filter 83 to a phase meter 85.

Owing to the rotation of the antenna 69, the 5000 megacycle carrier received at the receiver 5 varies in amplitude 60 times per second. This provides a 60 cycle component in the output of the receiver whose phase depends upon the azimuth of the mobile station. This component, which may be called the directional phase signal, goes through a filter 87 to the phase meter 85. The phase meter may be of known type, rotating a shaft 89 in accordance with variations in the phase relationship between the two input signals. A dial and pointer arrangement 91, calibrated in terms of azimuth, may be connected to the shaft 89.

The output of the receiver 23 is applied to the indicator or display system 67, which may include a polar facsimile recorder of the type described in U. S. Patent 2,637,024, issued April 28, 1953, to Joseph Lyman et al. and entitled Craft Position Plotting System.

The recorder includes an arm 93 extending radially from a shaft 95 which is coupled to the motor 29 and driven thereby to sweep the arm 93 over a circular area on a sheet 97 of sensitized facsimile recording paper supported on a flat plate 99. The arm 93 carries a plurality of styli 101 spaced at small intervals radially from the shaft 95, each connected to a respective one of a plurality of slip rings 103 on the shaft 95. Each slip ring is connected through a brush to an output terminal of one of a bank of filters 105. The filters 105 are designed to pass different relatively narrow frequency bands, each comprising a limited portion of a relatively wide continuous spectrum. The input terminals of the filters 105 are connected to the receiver 23.

The timing signal is provided in the system of Fig. 3 as follows: A phase shifter 107 is coupled to the motor 29 and driven thereby in synchronism with the recorder shaft 95. The rate of rotation may be of the order of ten revolutions per minute. The output of the phase shifter 107 is thus a 60 cycle signal like the reference phase signal, but varying continuously in phase with respect thereto, at the rate of 360 degrees per rotation of the recorder shaft 95. This signal is applied to a modulator 109, where it modulates a subcarrier generated by a subcarrier generator 111. The frequency of this subcarrier may be 120 kilocycles per second, for example, and after modulation by the varying-phase timing signal it is applied to the transmitter 3.

At the mobile station, a filter 113 separates the 120 kilocycles subcarrier from the output of the receiver 5 and applies it to a demodulator 115 like the demodulator 81. A filter 117 passes the 60 cycle varying phase signal to a phase meter 119 which may be like the phase meter 85. The phase meter 119 drives a shaft 121. Since the phase relation between the two inputs to the phase meter 119 corresponds at every instant to the angular position of the recorder shaft 95, the shaft 121 is rotated in synchronism with the shaft 95.

The mobile station portion 47 of the distance measuring equipment includes an oscillator 123 which modulates a transmitter 125. The oscillator 123 is also connected to a phase detector 127. The phase detector has a second input circuit which is connected to the output terminals of a receiver 129.

The ouput of the phase detector energizes or controls the energization of a motor 131 to drive the shaft 51. An indicator 133, calibrated in terms of distance, is coupled to the shaft 51. The shaft 51 is also coupled to the oscillator 19 so as to control its frequency.

The reference station portion 49 of the distance measuring equipment includes a receiver 135 designed to respond to the transmitter 125, and a transmitter 137 which is modulated by the output of the receiver 135 and is designed to operate at the same frequency as the mobile station receiver 129.

In the operation of the distance measuring equipment, the output of the oscillator 123 is transmitted to the reference station and returned to the mobile station, by way of the transmitter 125, receiver 135, transmitter 137, and receiver 129. The output of the receiver 129 is like that of the oscillator 123, but is delayed with respect thereto by the length of time required for radiation to make the round trip between the mobile station and the reference station.

The phase detector 127 will produce no output if the two inputs to it are 90 degrees out of phase. If they are less than 90 degrees out of phase, the phase detector 127 will energize the motor 131 to run in such direction as to increase the frequency of the oscillator 123. Conversely, if the two inputs are more than 90 degrees out of phase, the frequency of the oscillator 123 will be decreased. In either event, the frequency is adjusted to a value such that the time for one quarter cycle (90 degrees) of the oscillator output is equal to the radiation travel time. Thus the angular position of the shaft 51 will depend upon the distance of the mobile station from the reference station.

The switch 11, instead of operating directly upon the connection between the oscillator 19 and the transmitter 21 as in the system of Fig. 1, actuates a relay 139 to close momentarily contacts 141, 143 and 145. The contacts 141 connect the oscillator 19 to the transmitter 21. The contacts 143 connect the receiver 129 to the phase detector 127 and the contacts 145 connect the oscillator 123 to the transmitter 125.

Another modification in the system of Fig. 3 is in the provision of a highly directive antenna 147 for the receiver 23 at the reference station. This antenna is rotated by the motor 29 in synchronism with the recorder shaft 95, and always "points" in the direction from which a transmission may be received from a mobile station at any particular instant. The antenna 147 may also be used for the receiver 135 of the distance measuring equipment 49, although a separate antenna is indicated in Fig. 3 to avoid confusion.

As in the system of Fig. 1, one contact of the switch 31 is driven by the timing motor 29, and the other contact is manually adjustable by means of the handwheel 33. The distance selector 25 may comprise a multiple contact switch for connecting the output of any one of the filters 105 to the switch 31. At the mobile station, the output circuit of the receiver 5 is connected through a band pass filter 149 and a pair of contacts 155 to the selector 35, which may in this case be a relatively narrow pass band filter which is adjustable by means of the shaft 35 to pass substantially only the frequency to which the reporting oscillator 19 is timed. The contacts 155 are arranged to be closed by the electromagnet 139. The filter 149 is a relatively wide band pass filter designed to pass the entire band through which the oscillator 19 may be tuned, but to reject the 60 cycle, 100 kilocycle, and 120 kilocycle components in the output of the receiver 5.

The output of the filter 35 is applied to a rectifier 151 which is connected to a signal indicator device 153. The device 153 may be a lamp or other visual signalling device, or may include a relay for controlling a signalling device.

The operation of the system of Fig. 3 is substantially the same as that of Figs. 1 and 2. The switch 11 at any particular mobile station closes momentarily each time the recorder arm 93 at the reference station passes through an angular position corresponding to the azimuth. This connects the distance reporting oscillator 19 to the transmitter 21; at this same time the directive antenna 147 at the reference station is pointed toward the mobile station.

It is possible and preferable under certain circumstances to design the antenna 147 to have such a narrow beam that the length of the time during which signals can be received from the mobile station transmitter 21 is determined by the antenna 147 rather than by the period of closure of the switch 11. The overall operation of the system will be the same except that the marks produced on the recording paper 97 may be somewhat smaller and more accurately positioned in azimuth.

The relay contacts 143 and 145 prevent operation of the radio elements of the mobile distance measuring equipment except during the brief instants during each timing cycle when the switch 11 is closed. The distance information is nevertheless continuously available at the indicator 133, simply being corrected if necessary each time the switch 23 closes. Since each mobile transmitter 21 operates only at instants corresponding to the azimuth of the respective mobile station, no interference can occur as a result of two mobile stations at the same distance from the reference station transmitting signals of substantially equal frequency to the receiver 135. Also, since the receiver 129 is disconnected except when the transmitter 125 operates, signals transmitted from the reference station transmitter in response to signals from other mobile stations at different azimuths will not reach the phase detector 127.

The handwheel 33 and the selector 25 are adjusted according to the observed direction and distance respectively of the mobile station with which communication is desired, and the key 32 is closed. The switch 31 will then close at the same instant as the switch 11 during each timing cycle. The distance-characteristic signal from the oscillator 19 goes to the reference station, through one of the filters 105, the switches 25 and 31, and back to the mobile station. Here it is conducted by the switch 155 to the filter 35, and thus reaches the rectifier 151 and the signal indicator 153.

Although the described embodiments are representative of the invention of the presently preferred form, it will be understood that various modifications may be made in carrying out the principles thereof. For example, a single transmitter at the mobile station may be used for both distance reporting and distance measurement, by subcarrier modulation or other known forms of multiplexing. Similarly, various functions may be combined at the reference station, in order to minimize the equipment and frequency spectrum required.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A selective communication system comprising, at a station from which intelligence is to be sent, a transmitter, a source of periodic timing signal, means for applying said timing signals to said transmitter, a receiver, means for selecting signals from the output of said receiver in accordance with the frequency of said signals, and means for applying said selected signals to said transmitter selectively and periodically in an adjustable time relationship with respect to said timing signal, said means including circuit closing means adapted to be operated in accordance with the intelligence to be transmitted.

2. A selective communication system comprising, at a station from which intelligence is to be sent, a transmitter, a source of periodic timing signal, means for applying said timing signals to said transmitter, a receiver, means for selecting signals from the output of said receiver in accordance with a characteristic of said signals, and means for selectively applying said selected signals to said transmitter periodically and in an adjustable time relationship with respect to said timing signal, said means including circuit closing means adapted to be operated in accordance with the intelligence to be transmitted.

3. A selective communication system including, at each station to which intelligence is to be transmitted, a source of signal whose frequency is characteristic of the respective station and means for transmitting said signal, said means being responsive to a timing signal which denotes periodic instants of time to transmit periodically at intervals delayed with respect to said instants by an amount which is also characteristic of said station; a receiver, means for selecting from the output of said receiver only signals of substantially the same frequency as said first mentioned signal, indicator means and means for applying said selected signals to said indicator means substantially concurrently with the transmission of said first mentioned signal.

4. A selective communication system including, at each station to which intelligence is to be transmitted, a source of signal characteristic of the respective station, a transmitter, and means for periodically modulating said transmitter with said signal, said means comprising circuit closing means including a device providing a delay characteristic of said respective station and responsive to a timing signal to close periodically at intervals and in a time relationship with respect to said timing signal which depends upon the length of said delay; a receiver, means for selecting from the output of said receiver only signals characteristic like said first mentioned signal of said respective station, indicator means and means including said circuit closing means for applying said selected signals to said indicator means.

5. The invention set forth in claim 4, further including means for controlling the frequency of said first mentioned signal according to the distance of said station from a reference point, and means for controlling the length of said delay according to the direction of said station from said reference point.

6. In a system for signalling from a station at a reference location to a selected mobile craft, means on each craft with which the system is to operate for providing a signal which varies in a characteristic according to the distance of said craft from said reference point, means for transmitting said signal to said reference station, means at said reference station for receiving signals transmitted thereto from said craft and for selecting the signal received from the craft which is to be signalled, means for keying or modulating said selected signal, means for transmitting said selected signal to said craft, and means on said craft responsive to correspondence in said characteristic between said first mentioned signal and said last mentioned signal to effect an indication.

7. A selective communication system including, at each station to which intelligence is to be transmitted, a source of signal characteristic of the distance of the respective station from a reference point and means for transmitting said signal, said means being responsive to a timing signal to transmit periodically at intervals and in a time relationship with respect to said timing signal which depends upon the direction of said respective station from said reference point; a receiver, means for selecting from the output of said receiver any signals characteristic like said first mentioned signal of said distance, indicator means and means for applying said selected signals to said indicator means; at each station from which intelligence is to be transmitted, a source of timing signal, a receiver and means for reproducing said characteristic signals transmitted from said first mentioned stations, means adjustable to select any of said distance-characteristic signals, a transmitter, means applying said timing signal to said transmitter, and means responsive to said timing signal for applying said selected characteristic signals to said transmitter periodically and in an adjustable time relationship with respect to said timing signal, said last mentioned means including circuit closing means adapted to be opened and closed in accordance with the intelligence to be transmitted.

8. A selective communication system including, at each station to which intelligence is to be transmitted, a source of signal whose frequency corresponds to the distance of the respective station from a reference point and means for periodically transmitting said signal, said means being responsive to a timing signal to transmit periodically at intervals and in a time relationship with respect to said timing signal which depends upon the direction of said station from said reference point; a receiver, filter means for selecting from the output of said receiver any signals of substantially the same frequency as first mentioned, indicator means, and means for applying said selected signals to said indicator means substantially only concurrently with the transmission of said first mentioned signal; at each station from which intelligence is to be transmitted, a source of timing signal, a receiver for reproducing said characteristic signals transmitted from said first mentioned stations, filter means adjustable to select any of said characteristic signals, a transmitter, means applying said timing signal to said transmitter, and means responsive to said timing signal for selectively applying said selected characteristic signals to said transmitter periodically and in a time relationship with respect to said timing signal which is adjustable according to the distance from said reference point of said first station, said last mentioned means including circuit closing means adapted to be opened and closed in accordance with the intelligence to be transmitted.

9. A selective communication system including, at each station to which intelligence is to be transmitted, a source of signal characteristic of the respective station and means for periodically transmitting said signal, said means including a device providing a delay characteristic of said respective station and circuit closing means coupled thereto and responsive to a timing signal to transmit periodically at intervals and in a time relationship with respect to said timing signal which depends upon the length of said delay; a receiver, means for selecting from the output of said receiver any signals characteristic like said first mentioned signal of said respective station, indicator means and means including said circuit closing means for applying said selected signals to said indicator means; at each station from which intelligence is to be transmitted, a source of timing signal, a receiver and means for reproducing said characteristic signals transmitted from said first mentioned stations, means adjustable to select any of said characteristic signals, means including an adjustable delay device and circuit closing means coupled thereto and responsive to said timing signal to close periodically at intervals and in a time relationship with respect to said timing signal which depends upon the adjustment of said delay device, a transmitter, means applying said timing signal to said transmitter, and means for applying said selected characteristic signals to said transmitter, said last mentioned means including said circuit closing means and further circuit closing means adapted to be opened and closed in accordance with the intelligence to be transmitted.

References Cited in the file of this patent

UNITED STATES PATENTS

| Number | Name | Date |
|---|---|---|
| 2,252,083 | Luck | Aug. 12, 1941 |
| 2,403,603 | Korn | July 9, 1946 |
| 2,407,199 | Wolff | Sept. 3, 1946 |
| 2,421,106 | Wight | May 27, 1947 |
| 2,468,083 | Labin | Apr. 26, 1949 |
| 2,483,097 | McIlivain | Sept. 27, 1949 |
| 2,531,412 | Deloraine | Nov. 28, 1950 |